United States Patent [19]
Widlund

[11] 3,867,623
[45] Feb. 18, 1975

[54] AUTOMOTIVE GAUGE FLOOD-LIGHTED DIAL

[75] Inventor: Charles R. Widlund, Schwenksville, Pa.

[73] Assignee: Ametek, Inc., New York, N.Y.

[22] Filed: Oct. 31, 1973

[21] Appl. No.: 411,392

[52] U.S. Cl. ........ 240/2.1, 116/129 L, 116/DIG. 36, 240/8.16
[51] Int. Cl. .......................................... G01d 11/28
[58] Field of Search ..... 116/129 R, 129 L, DIG. 36, 116/129 F, 129 P; 240/2.1, 8.16, 1 EL; 73/431

[56] References Cited
UNITED STATES PATENTS

| 2,262,920 | 11/1941 | Carbonara | 240/1 EL X |
| 2,837,052 | 6/1958 | Viret | 116/129 R |
| 2,837,053 | 6/1958 | Viret | 116/129 R |
| 2,918,034 | 12/1959 | Neugass | 116/129 R |

Primary Examiner—Richard C. Queisser
Assistant Examiner—Daniel M. Yasich
Attorney, Agent, or Firm—Smythe & Moore

[57] ABSTRACT

An indicator gauge has a dial face whose peripheral edge is spaced from the wall of a casing and a light source is mounted behind the dial face. A ring having a light reflecting surface is positioned in front of the dial face to receive light through the space between the casing wall and the peripheral edge of the dial face and to reflect this light across the dial face. The reflecting ring is provided with a plurality of spacer posts to position the ring in front of the dial face.

5 Claims, 5 Drawing Figures

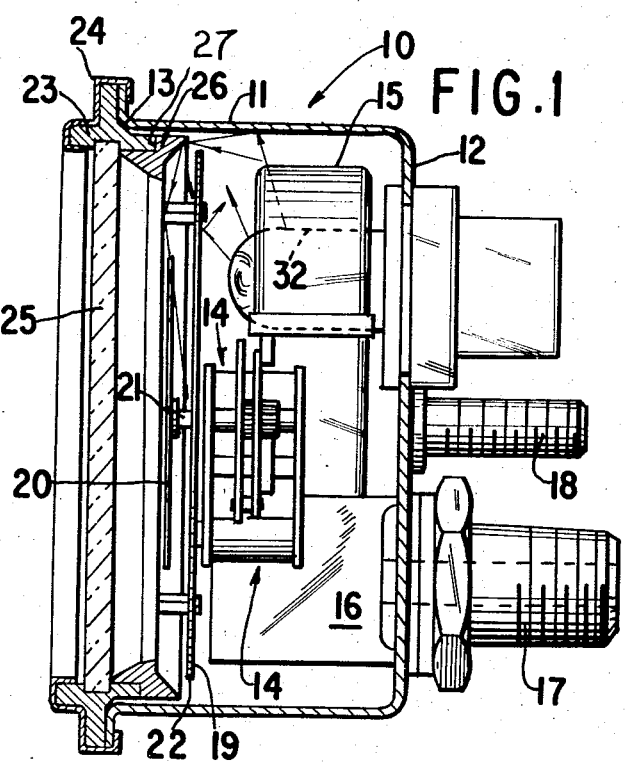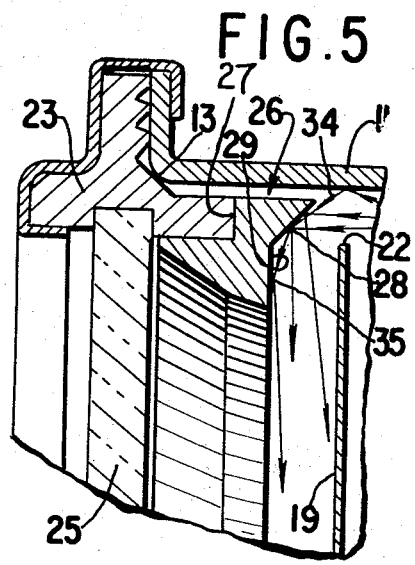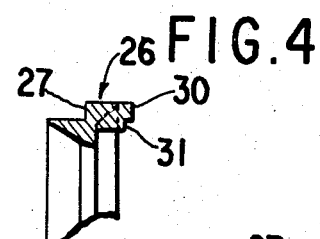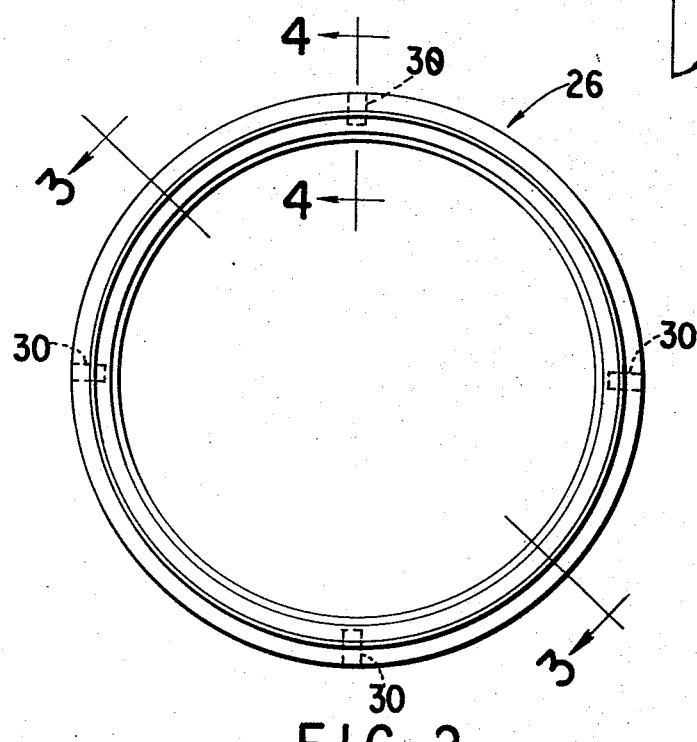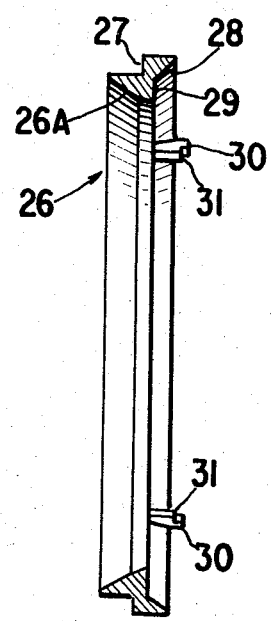

AUTOMOTIVE GAUGE FLOOD-LIGHTED DIAL

The present invention relates to an indicator instrument and, more particularly, to the illumination of the dial face of such an instrument.

Indicator instruments generally comprise a dial face upon which is a scale and there being a pointer responsive to the condition moving over the scale so as to be indicative of a condition being sensed. The dial face and pointer are enclosed by a transparent viewing window. Such instruments are used to indicate a wide variety of conditions and occasionally are used under circumstances wherein relatively low levels of illumination make the dial face difficult to see. For such application, various forms of lighting arrangements have been proposed in order to illuminate the dial faces. In particular, when instruments are used in automobiles, aircraft or boats, the instruments must be clearly visible at all times and particularly when the vehicles are being operated at night. The illumination also must be such as not to impair vision.

While illumination from prior structures was quite satisfactory, the reflecting and lighting structure invariably involved the addition of a number of components which greatly complicated the assembly of the instruments. In addition, such lighting arrangements did not provide a uniform level of illumination across the entire surface of the dial face. As a result, certain portions of the dial face were difficult to read at night.

One of the objects of the present invention is to provide an improved illuminating arrangement for an indicator instrument.

Another of the objects of the invention is to provide an indicator instrument in which the dial face is uniformly illuminated by light reflected from a light source behind the dial face.

According to one aspect of the present invention, an indicator instrument may comprise a cylindrical casing of the type which is closed at one end and open at the other end. A dial face is positioned within the casing adjacent the open end thereof and has its peripheral edge spaced from the casing wall. A light source is positioned within the casing behind the dial face. The light reflecting means is positioned in front of the dial face so as to receive light from the light source through the space between the casing and the edge of the dial face and to reflect this light across the dial face to illuminate the same. The light reflecting means may comprise an annular ring positioned between the dial face and a bezel ring mounted at the open end of the casing to retain a viewing window. The reflecting ring is provided with a reflecting surface to receive light from the light source and to reflect this light across the dial face. Spacer means are provided on the reflecting ring to position the ring with respect to the dial face.

Other objects, advantages and features of the present invention will become apparent from the accompanying description and drawings, which are merely exemplary.

In the drawings:

FIG. 1 is a longitudinal sectional view of an indicator instrument incorporating the lighting arrangement of the present invention;

FIG. 2 is a plan view of the light reflecting ring;

FIG. 3 is a sectional view taken along the line 3—3 of FIG. 2;

FIG. 4 is a fragmentary sectional view taken along the line 4—4 of FIG. 2; and

FIG. 5 is a portion of the sectional view of FIG. 1 but in enlarged scale to show the details of structure of the light reflecting ring.

Proceeding next to the drawings wherein like reference symbols indicate the same parts throughout the various views, a specific embodiment of the present invention will be described in detail.

In FIG. 1 there is indicated generally at 10 an indicator instrument incorporating the present invention. The instrument comprises a cylindrical or suitably shaped casing 11 having a closed end 12 and an open end 13. Mounted within the casing is an instrument movement 14 which is connected by a suitable linkage to a condition sensing or responsive structure. In the present embodiment, the instrument is a pressure gauge including a Bourdon tube 15 whose outer or free end is connected through linkage to the movement. The inner or fixed end of the Bourdon tube is connected to a socket or base 16 which extends outwardly of the casing through an opening in the rear wall 12 and terminates in a threaded portion 17 which may be connected to the source of pressure being indicated.

In a manner known in the art, the rear wall of the casing is also provided with mounting screws 18.

Mounted on the front portion of the movement is a dial face 19 and an indicator pointer 20 which moves over the dial face. The pointer 20 is mounted upon a shaft 21 which is connected to the movement 14 in a manner known in the art.

The peripheral edge 22 of the dial face is spaced inwardly of the cylindrical wall as may be seen in FIGS. 1 and 5.

The open end of the instrument has a bezel ring 23 mounted thereon and secured in position by a clamping ring 24. A transparent viewing window 25 is secured within the bezel ring in a manner known in the art.

Positioned in front of the dial face 19 and between the dial face 19 and the viewing window 25 is a light reflecting ring 26 shown in greater detail in FIGS. 2–5. The configuration of the reflecting ring is illustrated in FIGS. 3–5 and it can be seen that the reflecting ring has an outer shoulder 27 which rests against a portion of a bezel ring. The face of the ring directed toward the dial face is provided with an annular light reflecting surface 28 which is positioned at an angle with respect to the dial face as shown. A second annular surface 29 is positioned inwardly of the reflecting surface 28 and is substantially parallel to the dial face 19.

A plurality of spacer posts 30 extend axially from the ring 26 toward the dial face. Each of the spacer posts is provided with a shoulder 31 within which is seated the peripheral edge of the dial face. Thus, the reflecting ring is positioned at a predetermined distance from the dial face.

Mounted within the casing and behind the dial face is a light source 32 which comprises a bulb partially enclosed by Bourdon tube 15. The light source 32 may be mounted in a socket from which extends electrical leads through the cylindrical wall 12 for connection to a source of electrical energy.

For some particular applications, the light source may be self-contained and may comprise a battery or similar device mounted within the casing to provide electrical energy for the light source.

In operation, it is noted that the light rays from the light source pass through the space between the peripheral edge 22 of the dial face 19 and the inner face of the cylindrical wall 11. the light rays indicated at 34 impinge upon the reflecting surface 28 to be reflected at 35 across the dial face 19. It is noted that the surface 29 on the reflecting ring 26 prevents a substantial portion of the light rays reflected from surface 28 from passing through the viewing window 25. Thus, most of the light received from the light source is reflected across the dial face to provide a uniform level of illumination.

The reflecting ring 26 may be molded from a suitable black plastic and is extremely simple in structure. The presence of the spacer posts 30 will orient properly the reflector ring with respect to the dial face. Annular portion 26A (FIG. 3) serves to cover the edge of the dial for appearance purposes.

Thus, it can be seen that the present invention discloses an indicator instrument which has a simple but effective structure for illuminating properly and uniformly a dial face. Since this illumination is accomplished by reflected light, glare or spots of intense light are obviously eliminated.

It will be understood that changes in various details or construction and arrangement of parts may be made without departing from the spirit of the invention except as defined in the appended claims.

What is claimed is:

1. In an indicator instrument, the combination of a casing, a dial face within said casing and having its peripheral edge spaced from the casing wall, a light source mounted within said casing behind said dial face, and light reflecting ring means positioned between the front of the casing and the dial face, said ring means comprising a light reflecting surface facing the light source and a surface portion thereof extending annularly beyond said dial face at a predetermined distance therefrom for receiving light from said light source around and between the casing and dial face edge and for reflecting said light across the entire dial face to illuminate the same, the light reflecting ring means having spacer means for engaging the dial face peripheral edge for maintaining the dial face predetermined distance therefrom.

2. In an indicator instrument as claimed in claim 1 and comprising a bezel ring within said casing at the open end thereof and a viewing window mounted in said bezel ring, said reflecting ring means being positioned between said bezel ring and said dial face.

3. In an indicator instrument as claimed in claim 1 wherein said reflecting ring means has a second annular surface thereon inwardly of said reflecting surface and substantially parallel to the dial face to prevent the escape of light outwardly of the indicator instrument.

4. In an indicator instrument as claimed in claim 1 wherein said spacer means comprises a plurality of axially extending posts on said light reflecting ring means.

5. In an indicator instrument as claimed in claim 4 wherein each of said posts has an inwardly directed shoulder portion upon which the dial face is seated.

* * * * *